M. KRAUT & F. B. KOLLBERG.
PROCESS FOR AERATING LIQUID.
APPLICATION FILED NOV. 8, 1916.
1,261,556.
Patented Apr. 2, 1918.
2 SHEETS—SHEET 1.
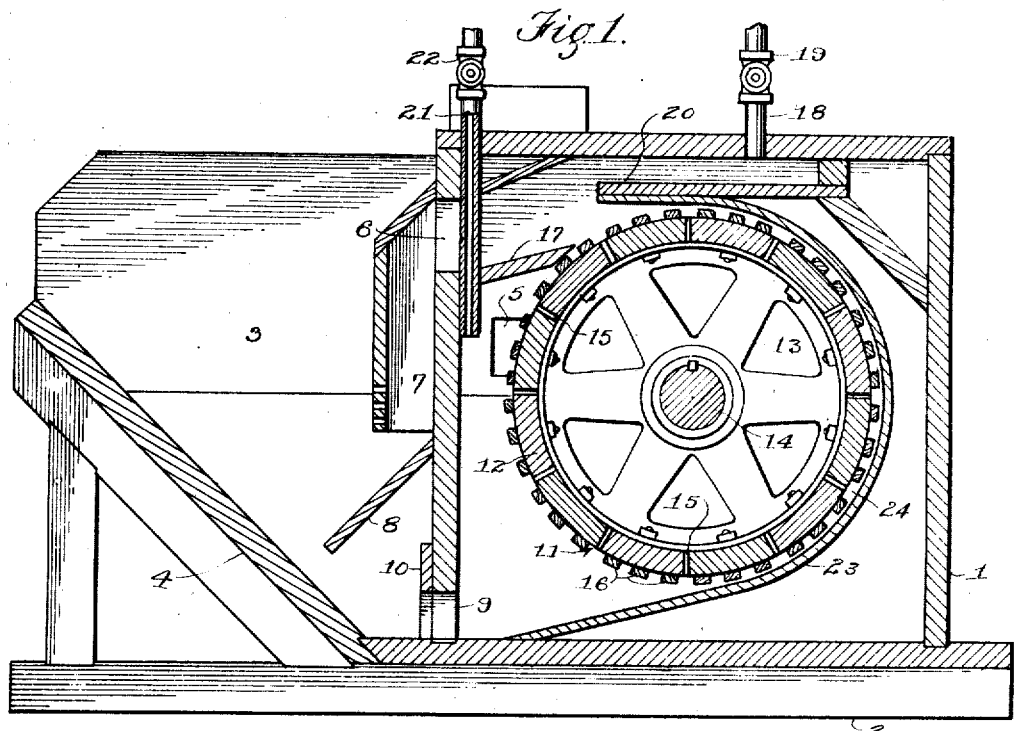
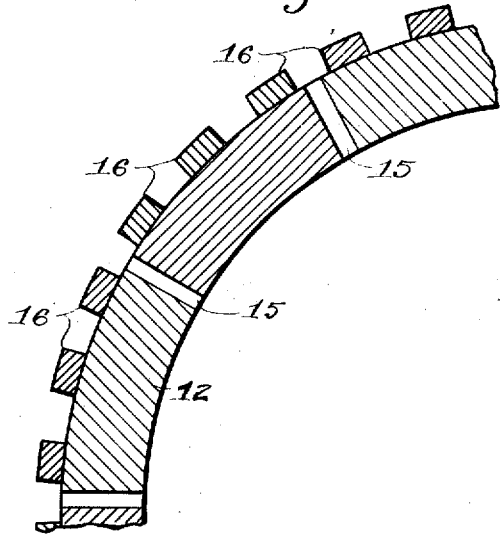
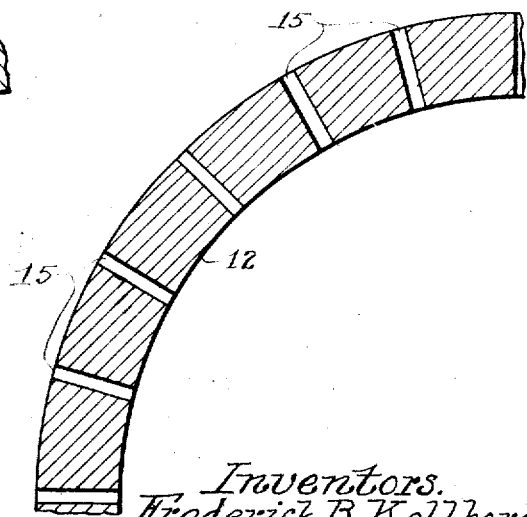
Inventors.
Frederick B. Kollberg.
Max Kraut.
by Edmund A. Strause Atty.

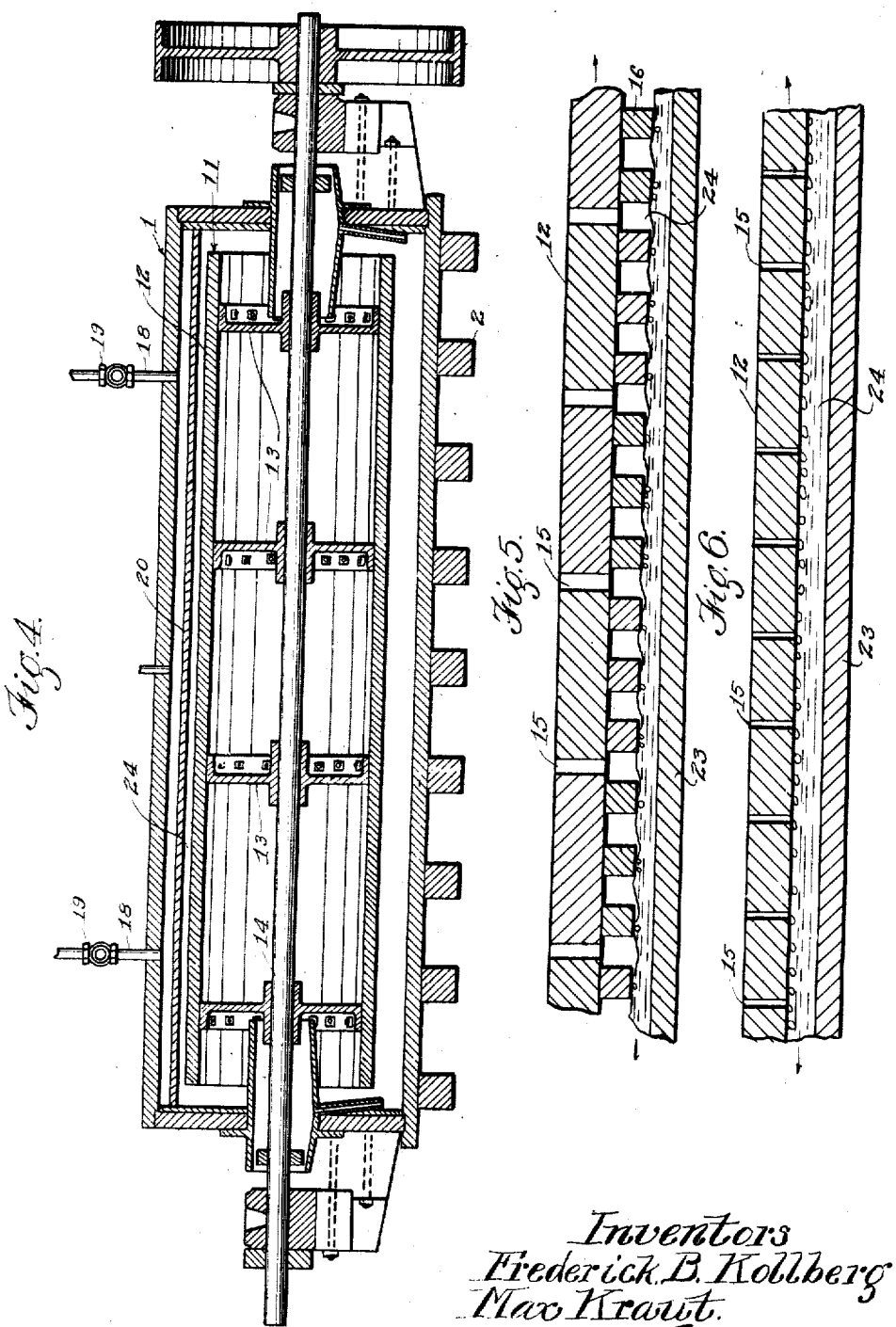

UNITED STATES PATENT OFFICE.

FREDERICK B. KOLLBERG, OF BISBEE, ARIZONA, AND MAX KRAUT, OF LOS ANGELES, CALIFORNIA, ASSIGNORS TO SOUTHWESTERN ENGINEERING COMPANY, A CORPORATION OF CALIFORNIA.

PROCESS FOR AERATING LIQUID.

1,261,556.  Specification of Letters Patent.  Patented Apr. 2, 1918.

Application filed November 8, 1916. Serial No. 130,170.

*To all whom it may concern:*

Be it known that we, FREDERICK B. KOLLBERG, residing at Bisbee, in the county of Cochise, State of Arizona, and MAX KRAUT, residing at Los Angeles, in the county of Los Angeles, State of California, both citizens of the United States of America, have invented new and useful Improvements in Processes of Aerating Liquid, of which the following is a specification.

This invention relates to a process of aerating liquid and is especially adaptable for aeration of pulp in mineral separation processes.

It is an object of this invention to provide a process whereby air or other fluid may be introduced into liquid to form a froth, with a minimum of energy.

Heretofore mechanical agitation of pulp in flotation machines for the purpose of producing froth has been very inefficient, because of the wastage of energy in moving the pulp about without accomplishing the entertaining of any great amount of air. By our process we expose a maximum of surface of the pulp to the air, introduce the air into a passage, move the pulp over the air, thereby forming bubbles and move the bubbles and pulp from the passage.

A means for carrying out this process is disclosed in our application, S. N. 107,202 filed July 1, 1916, for reissue of Patent 1,174,737, Mar. 7, 1916, in which the flotation separation chambers are claimed, and in a co-pending application S. N. 130,169, filed Nov. 8, 1916, in which the aeration apparatus is claimed.

In the drawings, Figure 1 is a vertical transverse section through the aeration chamber of the apparatus.

Fig. 2 is a detail sectional fragment of the preferred form of aerating drum shown in Fig. 1.

Fig. 3 is a detail sectional view of a fragment of a modified form of aeration drum.

Fig. 4 is a vertical central longitudinal section through the aeration chamber of the apparatus.

Fig. 5 is a developed fragmentary diagrammatic view in section of the preferred form of aerating drum and casing. Fig. 6 is a diagrammatic view similar to Fig. 5 of the modified form of aerating drum, shown in Fig. 3 and casing.

Referring more particularly to the drawing, an elongated substantially rectangular aeration chamber 1 is mounted upon a suitable supporting framework 2. Extending along one side of the chamber 1 and substantially co-extensive therewith, is a frothing chamber or box 3, which is open at its upper side and provided with an inclined bottom 4. Communicating with the head end of the aeration chamber 1 is an entrance opening or passage 5, through which the pulp to be treated is introduced into said chamber. Leading from the bottom of the frothing chamber 3 at the opposite or tail end of the machine is a discharge pipe, not shown, through which tailings are discharged.

Formed in one side of the chamber 1 adjacent the upper edge thereof and extending longitudinally thereof is an aeration chamber discharge outlet 6 from which leads a downwardly extending passage 7 which communicates at its lower end with the chamber 3 as shown.

Arranged below the lower end of passage 7 is a baffle board or flange 8 which serves to deflect the pulp discharged through said passage outwardly. Leading from the bottom of the frothing chamber 3 to the bottom of the aeration chamber 1 are spaced return openings 9 which are controlled by a sliding gate 10 having a notched lower end to correspond with said openings 9.

Arranged in the aeration chamber 1 is the aeration element or drum 11. Said drum consists of a cylindrical wall 12 which is bolted as shown to spiders 13 fixed to a shaft 14 extending centrally through the aeration chamber and having its ends suitably mounted in bearings provided at the ends of said chamber. Air may freely circulate through the drum around the spider arms. The cylindrical wall 12 is provided with slots 15 which extend therethrough and communicate with the interior of the drum. The outer surface of the wall 12 is preferably made irregular in form, as clearly shown in the various figures of the drawing by means of a plurality of closely spaced longitudinally extending riffles 16 as shown in Fig. 2

The riffles 16 serve to entrap air therebetween and pocket or hold the same while the pulp slips thereover. In Fig. 3 the air is held by frictional contact with the surface of the drum and pulp slips thereover.

Provided in the chamber 1 at the lower edge of the outlet opening 6 is an inwardly projecting flange 17 which serves to direct toward said outlet opening the thin sheet of pulp centrifugally thrown from the aeration drum. Communicating with the upper end of the aeration chamber is a plurality of air supply pipes 18, passage through which is controlled by valves 19. Arranged in chamber 1 below the lower end of the air supply pipe 18 is a deflecting board 20 so arranged that the air which is supplied to the chamber 1 will be introduced into said chamber and adjacent the periphery of the aeration element tangentially thereto and in a direction toward the outlet opening 6. The thin sheet of pulp thrown from the aeration drum induces air from pipes 18 increasing the aeration of the pulp.

Oil supply pipes 21 are employed, communicating with the interior of the chamber, and are controlled by valves 22. A casing 23 is spaced from and about the rear portion of the drum 11 as indicated in Fig. 1, thereby providing an aeration space 24 of arcuate section through which the pulp travels and in which it is aerated. The casing 23 at its lower part is extended to the floor of the aeration chamber in a direction tangential to the aeration drum. This construction assists in the direction of pulp to the inlet of the aeration space.

In operation the aeration drum 11 is rotated at a suitable speed. The pulp level inside the aeration chamber is maintained by means of the gate 10 at such a height that the outer surface of the aeration drum is slightly immersed in the pulp, the latter being slightly higher than a tangent to the lower surface of the drum. The level is maintained just sufficient to fill the entrance to the aeration space 24. A greater height is not desirable, as agitation and beating of the pulp will result. This is ineffective in producing aeration and results in a loss of power. Excessive beating of the pulp may also result in emulsification which is found to be undesirable.

In the rotation of the drum the adhesion of the pulp to the drum causes a flow of the pulp at high velocity through the aeration space 24. This produces a high velocity head and a low pressure head, the pressure head decreasing with the increase of velocity head. By imparting sufficient velocity to the pulp the pressure head may be decreased to less than atmospheric pressure, and air induced through the perforations 15. It will be noted, that air may readily enter the interior of the drum through the hollow drip cups at each end of the chamber 1. Air is thereby introduced into the pulp and commingled therewith. Aerated pulp is thrown off the surface of the drum at the upper end of casing 23, due to the centrifugal action and encounters the apron 17, being directed thereby into the outlet opening 6; air is also induced through the pipe 18 into the aerating chamber, mixing with the pulp as it is thrown from the drum.

As the pulp passes into the passage 7, it moves downwardly into the frothing chamber. The froth overflows from the top of the frothing chamber carrying with it mineral; and the pulp sinks to the bottom for retreatment on return through opening 9 to the air chamber.

In mechanically actuated flotation machines especially of the horizontal type, bearings are necessary for the shaft carrying the agitators. These bearings, when below the level of the pulp, must be packed to prevent the pulp from leaking therethrough. Due to the sand and other gritty material in the pulp, the bearings and shaft rapidly wear and must be repaired and replaced. Our machine is not subject to such difficulty, as the bearings for the aeration drum shaft are not in contact with the pulp.

In the aeration device, shown herein, air is induced through slots 15, meets the surface of the thin stream of pulp which is moved by the drum through passage 24, because of adhesive and viscous action. There is a slippage of pulp relative to the drum, and the air entering the passage slips along the surface of the drum pocketing itself between riffles 16, in the preferred form of drum, or being held by the frictional action of the drum surface in the modified form, shown in Fig. 3. While held thus, the pulp draws a film thereover and bubbles are formed. The pulp and bubbles are then carried by the drum to the discharge exit of the passage 24 and thrown from the drum through opening 6 into the frothing chamber. This machine does not depend upon agitation for aerating of the pulp as a very slow rotation of the drum will result in aeration.

In Fig. 5, the pulp passing through aeration space 24 is shown with air pocketed between the riffles 16, the relative movement of the pulp and the wall 12 of the drum being indicated by arrows. The moving wall 12 carries the pocketed bubbles to the outlet of space 24 and discharges the pulp and bubbles in the form of a pulp. In Fig. 6 the air is drawn through perforations 15 into the space 24, being held by frictional contact with wall 12. Bubbles are thus formed and the pulp and bubbles moved through space 24 to the outlet.

What we claim is:

1. A process for separating minerals, which consists in moving a liquid pulp along a partially cylindrical passage, injecting air into said passage upon the surface of said liquid pulp, holding said air in said passage so that the liquid pulp passes thereover and draws a film thereof over said air, thereby forming bubbles from said liquid pulp, and moving said bubbles along said passage.

2. A process for separating minerals, which consists in moving a liquid pulp containing a percentage of oil therein along a partially cylindrical passage, placing the surface of said liquid pulp in contact with air, inducing the same into the passage upon the surface of said liquid pulp, pocketing the air between the surface of said liquid pulp and a wall of said passage, so that the liquid pulp passes thereover and draws a film thereof over said pocketed air, thereby forming oleaginous bubbles, and moving said bubbles along said passage.

In witness that we claim the foregoing we have hereunto subscribed our names this 9th day of October, 1916.

FREDERICK B. KOLLBERG.
MAX KRAUT.